United States Patent [19]

Vollert

[11] Patent Number: 4,755,877
[45] Date of Patent: Jul. 5, 1988

[54] APPARATUS FOR READING AND PRINTING ON A RECORDING MEDIUM

[75] Inventor: Emmeran Vollert, Grosshoehenrain, Fed. Rep. of Germany

[73] Assignee: Siemens Aktiengesellschaft, Berlin & Munich, Fed. Rep. of Germany

[21] Appl. No.: 738,488

[22] Filed: May 28, 1985

[30] Foreign Application Priority Data

May 29, 1984 [DE] Fed. Rep. of Germany ....... 3420097

[51] Int. Cl.[4] ........................ H04N 1/04; H04N 1/31; H04N 1/23
[52] U.S. Cl. .................................. 358/285; 358/296; 358/75
[58] Field of Search ................. 358/75, 285, 286, 293, 358/296, 294, 300, 304; 355/3 SH; 235/379; 101/2

[56] References Cited

U.S. PATENT DOCUMENTS

| | | | |
|---|---|---|---|
| 3,288,461 | 11/1966 | Smith | 271/35 |
| 3,502,814 | 3/1970 | Salaman et al. | 379/100 |
| 3,508,824 | 4/1970 | Leinbach | 355/3 SH |
| 3,511,564 | 5/1970 | Gawin | 355/3 SH |
| 3,585,289 | 6/1971 | Huber | 358/304 |
| 3,973,264 | 8/1976 | Costello | 358/304 |
| 3,988,571 | 10/1976 | Blair et al. | 235/379 |
| 4,005,527 | 1/1977 | Krallinger et al. | 358/256 |
| 4,027,142 | 5/1977 | Paup et al. | 235/379 |
| 4,207,579 | 6/1980 | Gamblin et al. | 346/75 |
| 4,320,406 | 3/1982 | Heinzl | 346/140 R |
| 4,348,697 | 9/1982 | Takahashi | 358/285 |
| 4,424,523 | 1/1984 | Snelling | 358/286 |
| 4,476,496 | 10/1984 | Thaler | 358/293 |
| 4,517,590 | 5/1985 | Nagashima | 358/75 |
| 4,542,414 | 9/1985 | Nagane | 358/285 |
| 4,567,585 | 1/1986 | Gelbert | 358/285 |
| 4,574,317 | 3/1986 | Scheible | 358/285 |
| 4,583,126 | 4/1986 | Stoffel | 358/293 |
| 4,595,957 | 6/1986 | Holthusen | 358/304 |

FOREIGN PATENT DOCUMENTS

| | | | |
|---|---|---|---|
| 0025707 | 12/1980 | European Pat. Off. | |
| 813016 | 7/1949 | Fed. Rep. of Germany | |
| 0164667 | 12/1981 | Japan | 358/285 |
| 2119201 | 11/1983 | United Kingdom | |

OTHER PUBLICATIONS

Telecon Report No. 21979(4), pp. 223-227, 1979.
Siemens-Zeitschrift 51 (1977) No. 4, pp. 219-221.

Primary Examiner—James J. Groody
Assistant Examiner—Robert M. Bauer
Attorney, Agent, or Firm—Hill, Van Santen, Steadman & Simpson

[57] ABSTRACT

Unitary apparatus for reading and/or printing a recording medium incorporates a read unit for optically scanning the recording medium and a print unit in the form of an ink jet printer for printing on the same or a subsequent area of recording medium. The recording medium is conducted in a planar condition through a path overlying the read unit and the print unit, both of which are mounted in fixed relation on a printer carriage for transverse movement relative to the printing medium. In this way line-by-line scanning of the recording medium or line-by-line printing of the recording medium can occur simultaneously with paper transport. The scanning and printing units may be either single color units, or may be multicolor scanning and multicolor printing units.

2 Claims, 5 Drawing Sheets

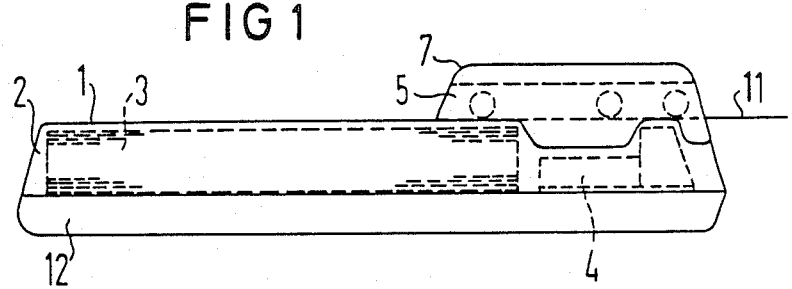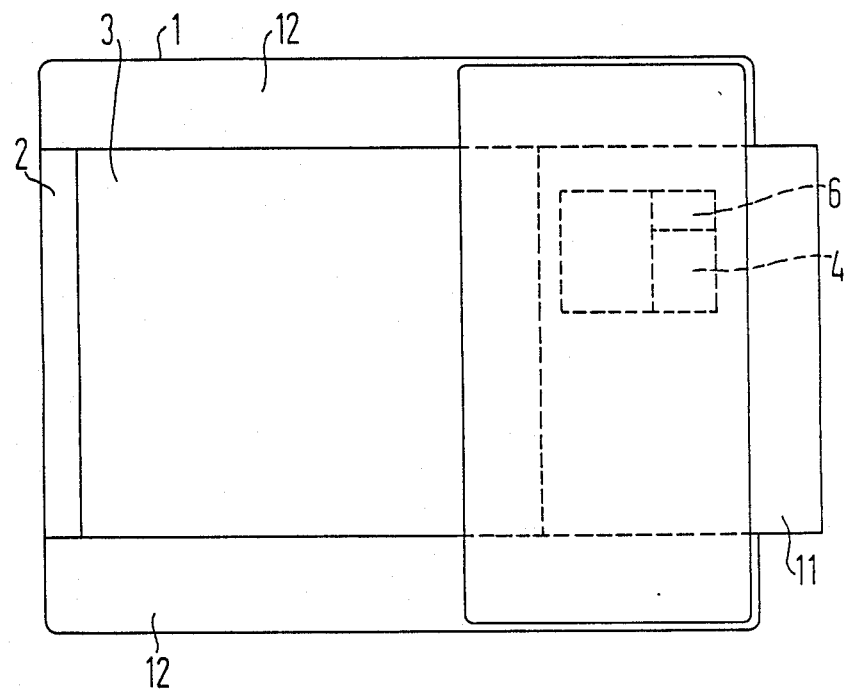

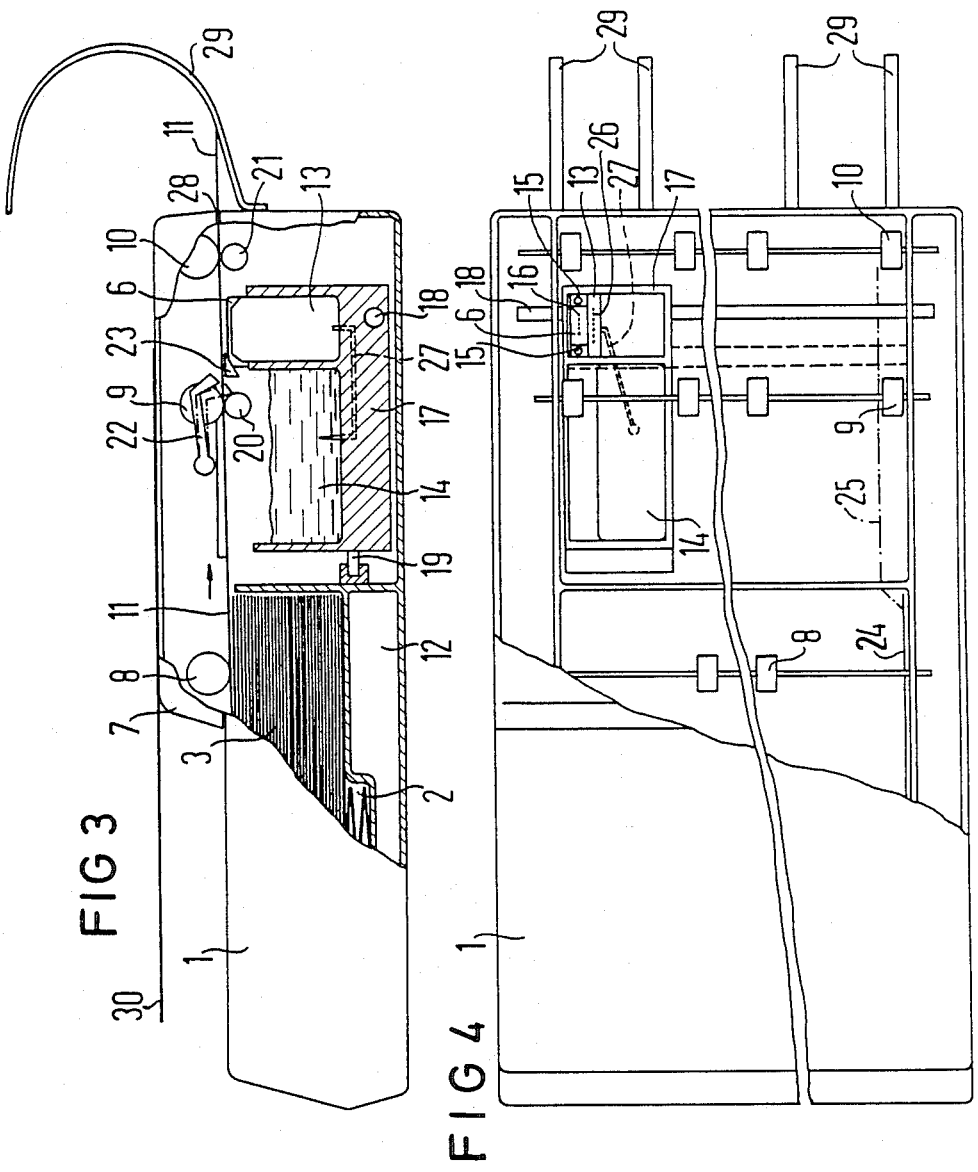

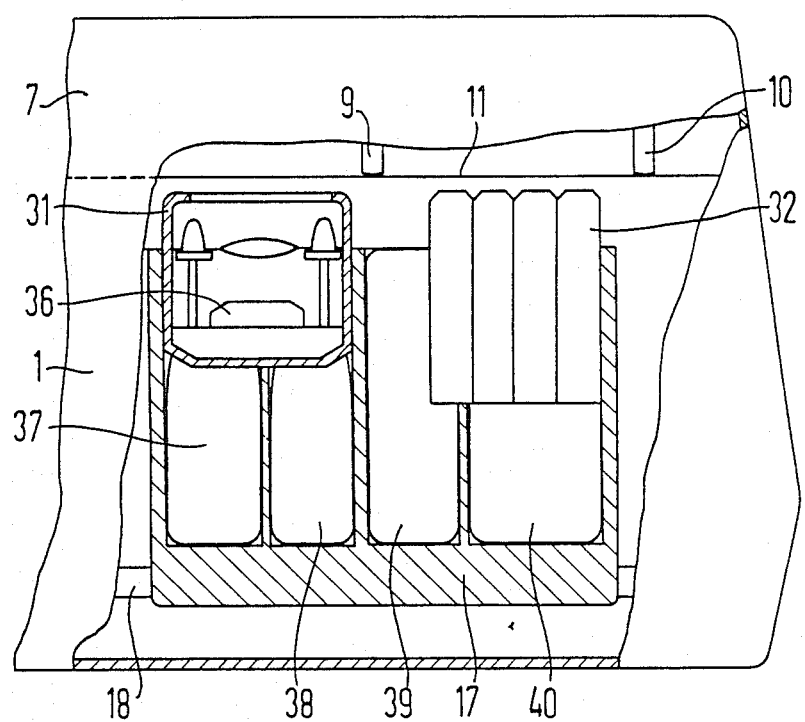
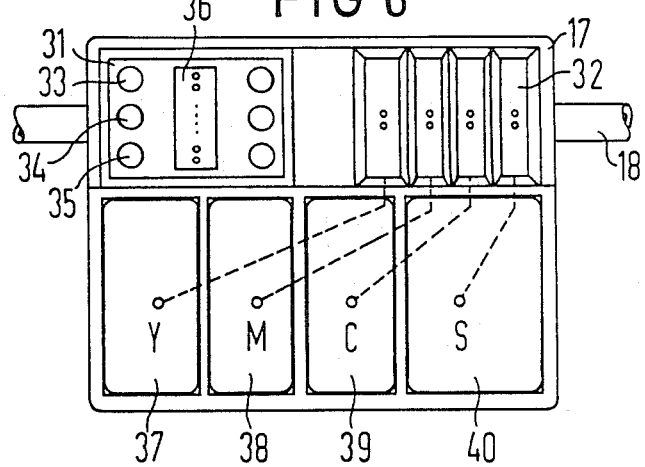

APPARATUS FOR READING AND PRINTING ON A RECORDING MEDIUM

BACKGROUND

1. Field of the Invention

The present invention relates to a single unitary apparatus for reading and/or printing on a recording medium.

2. The Prior Art

In a typical office printer apparatus, the recording medium, normally in the form of paper, is conducted over a drum arranged with a horizontal axis, in front of a print head adapted to move horizontally relative to the drum. Such printer apparatus requires relatively bulky devices for the introduction of the recording medium and its feed, which considerably enlarge the overall structure and bulk of the apparatus. In addition, such apparatus is not suitable for printing stiff and thick recording media, or media which is not able to execute a sharp bend to conform to the surface of the drum.

Copier apparatus has been described which maintains a recording medium in a planar condition, with the printing apparatus suspended above the recording medium. See for example German patent No. OS 3000466. The recording medium is held fast on a planar holding support, and the overall support is moved back and forth in one direction, while the print head simultaneously moves in a direction perpendicular thereto. While this arrangement accommodates thick or stiff recording medium, it presents a number of problems. For example, the recording medium must be held absolutely rigidly on the support for the duration of a printing operation, since even a slight slip in its position leads to recording errors. When a vacuum chamber is provided beneath the holding support, this considerably increases the cost of such apparatus. Also, critical requirements are imposed for the accuracy of the two drives which drive the support and the printing head respectively It is desirable to provide a combination of an optical read system with a printer, to allow both reading and printing to take place in a single unitary structure. Previous proposals for such a combination such as, for example, European patent No. OS 0025707 lead to a large and bulky structure which is not practical in many office locations. In addition, previous proposals for combinations of these functions involve a great expense in terms of time and complexity for design and production engineering.

BRIEF DESCRIPTION OF THE INVENTION

Accordingly it is the principal object of the present invention to provide a single unitary apparatus which is capable of optically reading graphics and other characters on original documents, as well as printing characters and patterns on a recording medium, and an apparatus which is small and compact, and provides for a flat format for reading and/or printing. In this way the limitations in the existing apparatus concerning the type and format of the recording medium are largely eliminated and the ergonomic conditions of the equipment are improved, enabling the employment of various printing apparatus such as an ink jet printer which operates according to the underpressure method.

In one embodiment of the present invention this object is achieved by a unit which incorporates a storage space for the recording medium, with a transport mechanism for transporting the recording medium through the unit, with read and printing mechanisms within the unit, disposed directly below the path of the recording medium, the transport mechanism adapted for transporting the recording medium past the read/print mechanism, and with a drive mechanism for moving the read/print mechanism relative to the recording medium in a direction transverse to that of the transport mechanism.

One of the significant advantages of the present invention is that a read operation or a print operation can be executed simultaneously with the transport of the recording medium through the unit.

The overall apparatus can be accommodated in a flat housing, which allows for ergonomic benefits, in addition to a small and compact format. The further advantage of the arrangement is that the recording medium runs through in a straight (planar) condition, so that very stiff and strong recording medium such as cardboard can be read and/or printed without problems. In addition, the present invention offers advantages when printing forms, since a form template can be read with the read unit, and the lines, characters and symbols of the form can be subsequently printed on multiple sheets in accurate register corresponding to the template.

Preferably, the printer unit is a wire matrix print head, or thermal printer. Since the printer is disposed underneath the recording medium, an ink jet printer can also be utilized with particular advantage, such printer operating according to the underpressure method, which achieves known advantages.

BRIEF DESCRIPTION OF THE DRAWINGS

Reference will now be made to the accompanying drawings in which:

FIGS. 1 and 2 are side and plan views of an illustrative embodiment of the present invention showing the positions of the various components thereof;

FIGS. 3 and 4 are side elevation and plan views (partly in section) of a preferred embodiment of the present invention;

FIG. 5 shows a elevational view, partly in section, of an alternative embodiment of the present invention adapted for multicolor reading and multicolor printing;

FIG. 6 shows a plan view of part of the apparatus illustrated in FIG. 5;

DESCRIPTION OF THE PREFERRED EMBODIMENTS

Figure 7:
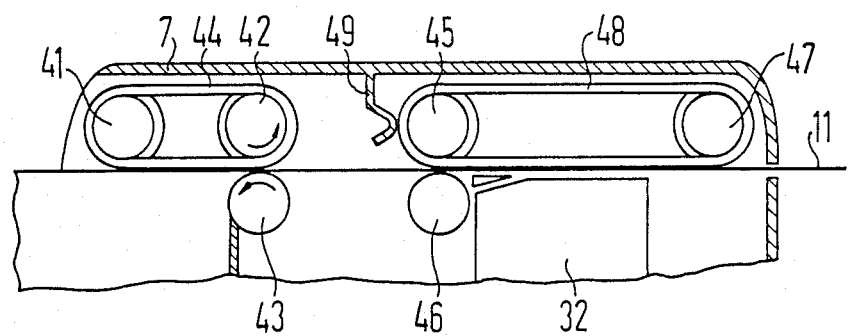
FIG. 7 shows a cross-sectional elevational view of part of the transport mechanism employed with an alternative embodiment of the present invention.

Referring now to FIGS. 1 and 2, the overall apparatus of the present invention is shown in a side elevational view and plan view respectively. It incorporates a lower housing part 1, and an upper housing part 7, the two being releaseably connected together by a hinge (not shown) so that the upper housing part 7 can be hinged up. A storage space 2 stores a supply of recording medium within the lower housing part 1, and it is shown in FIG. 1 in the form of a stack 3 of single sheets. A large space 12 is provided at the bottom of the lower housing part 1 for accommodating the electronic circuits of the apparatus. This space 12 also includes space at the sides of the storage space 2 (FIG. 2) for the housing of the electronic components. A printer device 4 is located near the right hand end of the lower housing part 1, and an optical read device 6 (FIG. 2) is disposed adjacent to the printer 4. The optical read device 6 preferably takes a form of an optical image scanner or a photodiode array. An arrangement for transporting the recording medium through the apparatus is contained in the area 5 of the upper housing part 7, and incorporates a plurality of rollers, as shown (FIG. 1).

FIGS. 3 and 4 illustrate the apparatus of FIGS. 1 and 2, respectively, in greater detail. In the apparatus illustrated in FIGS. 3 and 4, the printer is an ink jet printer functioning according to the underpressure method. The ink jet printer has a print head 13 and an ink reservoir 14, all located in the lower housing part 1. The ink reservoir 14 is a replaceable part, such as a replaceable ink bottle. The read unit 6 is a point reflection line scanner, the construction and apparatus of which are well-known. Such a scanner is composed of light emitting elements 15, a row of photodiodes 16, and a lens system (not shown) for focusing light reflected from small areas of the surface being read onto the photodiodes. Both the read unit 6 as well as the ink jet printer 13, 14, are supported together on a printer carriage 17, which is moveable back and forth along a guide 18 perpendicular to the feed direction of the recording medium. The top sheet 11 of the stack 3 is fed rightwardly, as illustrated in FIGS. 3 and 4, in a planar condition above the position of the read unit and the ink jet printer.

The means for transporting the top sheet 11 comprises a plurality of friction rollers 8, 9 and 10, with cooperating rollers 20 and 21, which are driven by motor and belt drive (not shown). Single sheets 11 of the stack 3 are grasped by the friction rollers 8 and transported toward the right of the machine in the direction of the arrow shown in FIG. 3. The friction rollers 9 and 20 accept a single sheet 11 and transport it through the printer device. In order to avoid smearing the print image which may not have completely dried, it is advantageous to dispose the cooperating rollers 21 at the edge margin of the recording medium, so that they grab the single sheet 11 only at the unprinted edges. The center friction rollers 9 have movable levers 22 associated with them which, as more fully explained hereinafter, serve the purpose of aligning the recording medium. A known, optically readable, line scale 23 is positioned immediately adjacent the read/print unit 6, 13. The upper edge thereof defines the vertical distance between the recording medium and the print head.

The space 12 provided for the electronic components required for the reader unit and the ink jet printer can be spread out in place of the relative freedom, so that involved cooling requirements are avoided. In addition, it is clear that no electronic or electrical components are situated immediately below the ink jet printer or its ink reservoir 14. This contributes not only to a low overall heighth of the apparatus, but also has the advantage that no damage or short circuits are caused by a potential ink leak.

The stack 3 of sheets of recording medium is situated so that the upper most sheet 11 of the stack 3 may be grabbed by the friction rollers 8, which is referred to as a draw-in roller. The friction rollers 8 has two functions. First, they grab the upper-most sheet, to function as a paper detacher or separator. Secondly, they conduct the detached upper sheet 11 toward the right, up to the alignment levers 22. The draw-in rollers 8 are driven with an overrunning clutch only at the times when introduction of a sheet is desired from the stack 3. The friction rollers 9 are lifted slightly during this time and the alignment levers 22 are lowered down, to align and stop the forward end of the sheet 11 transverse to the direction of motion. Continued motion of the sheet 11 pivots the levers 22, upwardly, and as the alignment levers 22 are lifted, the clutch applying power to the rollers 8 is opened, allowing them to freewheel, and the friction rollers 9 are lowered into contact with the sheet 11. Subsequently, the transport of the single sheet 11 is accomplished by the friction rollers 9 together with the cooperating rollers 20. The draw-in rollers 8 are no longer driven, but rotate in free-wheeling condition, as the sheet 11 proceeds with its movement.

Before it passes into the region of the print head 13, the single sheet 11 is conducted over the line scale 23, which, as commonly known, is part of the optical read system. By optically reading the reflecting and non-reflecting regions disposed on the line scale 23, in the form of stroke markings, in the known manner, control signals are developed for the movement of the printer carriage as well as for the start and ending of each line of printing on the sheet 11.

The scanning unit 6 recognizes the edges of the sheet 11 and produces a signal which can be employed for initiation of preparations for printing a line of characters or symbols on the sheet 11. For example, the start of printing for the first line on the sheet 11 can be determined by considering the spacing between the optical read unit 6 and the print head 13, as well as the speed of movement of the sheet 11. An adjustment of the upper margin, which is free of printing, of each of the sheets 11 can be determined and/or regulated in this manner.

The guidance of the single sheet 11 between the rollers 9 and 20 and between the rollers 10 and 21 assures that the vertical spacing between the surface of the print head 13 and the lower surface of the sheet 11 has a constant value in the printing region. This is of great significance for achieving printing of consistently good quality.

The rollers 9 and 10 are mounted so as to be free to move upwardly from their associated rollers 20 and 21, in order to accommodate sheets 11 of different thicknesses. The pressure operating between the rollers 9 and 20, and between the rollers 10 and 21 is defined either by the dead weight of the rollers and associated apparatus, or by spring power.

In order to accommodate sheets 11 of different widths, the lateral walls 24 of the storage space 2 may be moveable in accordance with the dashed line 25 (FIG. 4). In this case, it is also advantageous to laterally displace the lower cooperating rollers 21, so that they remain in engagement with the marginal edges of the sheet 11.

Printing is applied to the sheet 11 on its lower surface. This enables the use of an ink jet printer which works in accordance with the underpressure printing method. This is particularly advantageous because no additional measures need to be taken in order to prevent an uncontrolled emission of the ink from the nozzles of the print head. A suitable print head is described for example in Siemens Zeitschrift 1977, No. 4, pages 219–221. Other known print heads can also be employed, with the same advantages.

The print head 13 illustrated in FIGS. 3 and 4 operates in the following way. A series of ink channels are provided in the fluid-tight print head housing which channels end at the upper surface of the print head in one or more discharge openings 26. These channels communicate with the ink reservoir 14 by means of an ink feed line 27. Each ink channel has a piezoelectric drive element allocated to it under the influence of which a pressure shock wave is generated inside its corresponding ink channel, temporarily cancelling the normal underpressure condition, and ejecting a quantity of ink in the form of a droplet from the opening. This droplet is sprayed upwardly against the sheet 11. The slight underpressure which is a normal condition for the ink channels of the print head 13 is achieved by arranging the ink reservoir below the level of the discharge openings 26. The piezoelectric drive elements are energized in combination so that one or more droplets are ejected from the discharge openings to form one or more dots making up a single line of a character symbol. Complete characters and symbols are formed of a plurality of such lines, corresponding to droplets ejected from the openings 26 when the print head 13 occupies successive spaced positions relative to the recording medium 11.

In this way characters constructed in dot matrix fashion having an arbitrary shape can be represented at selected parts of the recording medium 11, by means of the relative motion between the recording medium and the print head 13. The ejection of individual droplets is controlled by pulses which are supplied to the piezoelectric drive elements from a character generator, which supplies the pulses needed to form a particular desired character.

The actual printing on the sheet 11 is performed in a line-by-line fashion, since the printer carriage 17 which carries the print head 13 moves back and forth along the lines of writing. With continuous paper feed, the single sheet 11 is moved passed the print head 13 and is pushed out through the discharge slot 28 between the rollers 10 and 21. An arcuate basket 29 catches the sheet 11 and carries it up to deposit it on a surface 30 above the printer apparatus, so that the printed side faces up and can be read. The basket 29 and the deposit surface 30 does serve as a collecting trough behind the printer. This performs a particularly advantageous arrangement, in that it can accommodate flexible sheets 11, and the arrangement can also accommodate rigid upbending recording media simply by removing the basket 29.

In addition to monitoring the front and back edges of each sheet 11, the optical read unit 6 is also capable of scanning all of the characters and symbols contained on the surface of the sheet 11. It can also sense the transport holes or special form feed holes in the recording medium and thus produce signals which can be used for synchronizing operation with continuous form paper. Since this is done optically and not mechanically, it is not necessary to supply any particular kind of drive with the recording medium 11, such as pin wheel drives, or tractor drives. The integrated provision of the read unit 6 and the print head 13 also makes it possible to use the apparatus as a facimile device or as a copier device. To that end, the read unit 6 preferably comprises a so-called CCD line sensor having photodiodes 16 which sense the characters or graphic patterns of the recording medium 11 on a column-by-column basis for each line. The feed of the top sheet 11 from the stack 3 as well the printing (if any) take place in the manner described above.

When the apparatus is used as a facimile device, the read head scans all of the characters and other marks present on the sheet 11, and develops electrical signals which may be transmitted to a remote location for conversion in the printing form. That can take place by using the apparatus as a printer, at the remote location, in which the received electrical pulses are connected to corresponding piezoelectric drive elements, for producing ink droplets corresponding to each dark point sensed by the scan unit 6. When the drive apparatus at the two remote locations are both synchronized, a printed copy is produced at one location corresponding to the scanned document at the other location.

When the unit is used as a copier apparatus the first sheet 11 is scanned and the electrical signals produced by such scanning are stored in a memory device (not shown) located with the space 12. In this case, the pulses are stored in the memory device instead of being transmitted to a remote location. When one or more subsequent sheets 11 are feed through the apparatus, the memory device is cause to sequentially read out these pulses, for operating the drive elements which cause dots to be formed on the recording medium at the appropriate locations. As many copies as desired in this fashion, by executing successive cycles the sheets are printed in accordance with the information stored in the memory unit. The physical proximity of the photodiodes of the scan unit and the jets of the print head, and their one-to-one correspondence, makes copies operation possible with a minimum of manipulation of the data. When the arrangement of photodiodes is a straight line parallel and adjacent the line of ink jets, a scanned document may be replicated merely by energizing the ink jet corresponding to the diode which sensed a dark spot at a corresponding location of the scanned document (or template), with such pulses advanced or retarded in time slightly to compensate for the side-by-side position of the scan unit and the print head.

Preferably the optical read unit 6 funtions as a so-called reflection scanner. A pair of light emitting diodes 15 (FIGS. 3 and 4) are disposed in a housing for luminating each sheet through a transparent part of the housing. The optical signals are suppied to the photodiode 16 by way of a lens system (not shown). The conversion of the light or dark areas on the recording medium is converted into electrical signals by these diodes. Since the read unit is disposed on the inside of the printer, below the sheet 11 being scanned, disruption by extraneous light is nearly completely avoided.

Integrating the line sensor in fixed position with the print head allows several diverse functions to be performed. It not only allows for reading of an original document, but also serves for sensing the line scale, sensing the paper position, sensing the beginning and end of the paper, and also sensing the movement and position of the paper by detecting form feed or transport holes in the paper.

In the embodiment illustrated in FIGS. 3 and 4, the document 11 is scanned for light or dark marks, and one color printing (such as black on white) takes place. However, multicolor scanning and multicolor printing are also possible with the present invention and the apparatus for accomplishing this is shown in FIGS. 5 and 6. These figures show only the parts which are essentially different from the apparatus already described in connection with FIGS. 3 and 4. A read unit 31 serves to scan multicolor originals, and a multicolor print head 32 is provided for multicolor printing. Both are mounted on the carriage 17. The carriage moves at right angles relative to the direction of movement of the recording medium, as described above. The scanning and printing take place below the surface of the recording medium, also as described above. The read unit 31 functions as a reflection scanner and incorporates a plurality of different color light emitting diodes 33, 34 and 35 which are disposed in pairs. These diodes emit light of red, green and blue color, corresponding to the three primary colors. The scanning of a single sheet 11 takes place on a line-by-line basis as known per se, such that each picture element of the characters or patterns to be scanned is illuminated by the individual diodes 33, 34 and 35 repeatedly, namely, three times. To this end the individual diode pairs are pulsed on and off, at successive times, so that the pulses produced by the photodiodes 36 correspond to the presence of colors on the sheet 11 which reflect red, green and blue light respectively. These pulses may be stored in memory for later use. For example, the information stored in memory may be forwarded to a color graphics picture screen system, in which the individual points of the screen are illuminated with red, blue or green light, in accordance with the detection of the presence of one or more of those colors at a particular position on the recording medium 11. Scanning within the color graphics picture system is coordinated with the readout from memory of information stored corresponding to successive lines of the sheet 11, so that the picture screen can accurately represent the colored material on the sheet 11, as scanned by the read unit 31.

The print head 32 is essentially an ink jet printer designed as a multicolor print head. It has a plurality of ink reservoirs 37, 38 and 39, corresponding to the subtractive primary colors yellow, magenta and cyan, respectively. A reservoir 40 is also advantageously provided for black ink which is useful for forming dots with minimum reflectivity. The ink reservoirs 37–40 are combined in an ink magazine which can be easily replaced as one or more of the reservoirs is exhausted. Alternatively the reservoirs can be refilled in the manner described in the German application No. P3401071.8.

The function of the multicolored present head 32 corresponds essentially to the print head described in connection with FIGS. 3 and 4. One difference, however, is that the ink channels of the multicolor print head communicates with the individual ink reservoirs in groups. Such a multicolor print head is disclosed for example in the German patent No. OS 2925812. In the illustration of FIG. 6, two discharge openings are provided for each of the four colors corresponding to the reservoirs 37–40. However a different allocation is also possible, incorporating a single opening for each color, or more than two openings. Similar to the arrangement described above, the channel associated with each of the discharge openings has its own piezoelectric driver, so that droplet can be ejected independently from the several discharge openings of a single color, and for all of the discharge openings of all of the colors. As a result of the relative motion between the print head 32 and the sheet 11, both because of motion of the sheet 11, and the transverse motion of the print head 32, each picture element (or pixel) within a matrix for a character representation can be printed with an ink droplet of an elementary color, or with a plurality of ink droplets of the same color (especially when plural discharge openings are provided for each individual color) or with droplets of different colors. A great number of mixed colors and shades of color, can be provided for each dot to be formed on the sheet 11, and multicolor chaacters or patterns can be represented on the sheet 11, by forming dots of different colors at different locations on the sheet 11.

As shown in FIG. 6, the discharge openings are disposed in rows. However it is also possible when move discharge openings are provided, to form such openings in groups, so that plural rows of dots can be formed simultaneously.

Referring to FIG. 7, a roller/belt system is illustrated, which can be used in the present invention in place of the rollers 8–10, 20–21 illustrated in FIGS. 3 and 4. For picking up and separating individual sheets, three rollers 41, 42 and 43 are employed, coupled with a belt 44, the rollers 41 and 42 as well as the belt 44 are located in the upper housing part 7. The roller 43 is rotated in a reverse direction to the roller 44, and thereby prevents a plurality of sheets from being drawn in simultaneously.

Further transport through the printer apparatus is accomplished by rollers 45, 46 and 47, and belts 48 which surround the rollers 45 and 47. The belts 48 are charged by means of an electrostatic charging device 49, disposed in the upper housing part 7 and in contact with the belts 48 as they pass around the rollers 45. By this means, the belts are electrostatically charged, to provide an attractive force between the belt and the recording medium. This suffices to reliably transport the recording medium without the need for multiple rollers engaging the bottom surface of the recording medium. This arrangement has the advantage that the rollers at the bottom of the recording medium can be eliminated downstream from the print head, so that possible smudging of the print image can be completely avoided. In addition, it is no longer necessary to have a mechanical adjustment for moving the bottom rollers to engage the side margins of the recording medium 11 for different widths which may be used. This arrangement also has the advantageous effect of stripping off small dust and dirt particles may adhere to the recording medium, so that contamination of the very fine jet openings of the ink jet printer head rarely occurs.

In the above description, single sheet operation has been described. Operation with so-called continuous recording medium, such as continuous roll paper or fan-fold paper, is also possible in the apparatus of the present invention. When fan-fold paper is employed, the recording medium is located outside the printer device is fed into the lower housing part between the rollers 9 and 20 (FIG. 3) or between the rollers 45 and 46 (FIG. 7). Then the transport of the recording medium takes place as described above. A separate tractor drive is not required. Correct alignment of the continuous recording medium is assured because of the long lateral walls of the storage space 12, which performs an aligning operation before the recording medium reaches the read/print unit. The scanning and printing take place with a straight run through, which is particularly advantageous for printing of labels since the tendency of the labels to peel away from their carrier material is largely avoided.

Figure 8:
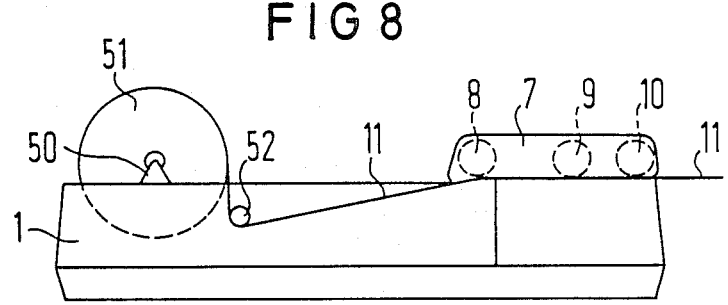
FIGS. 8–10 illustrate supplementary features which may be incorporated in apparatus embodying the present invention.

When continuous roll paper is employed, it is advantageous to mount a supply roll in the storage space of the printer device, in the manner shown in FIG. 8. The mount 50 for the roll 51 of the recording medium is supported on the mount 50 which is in turn supported by the base 51. A tension compensation roller is provided, and the recording medium 11 may be drawn off the roll and transported into the read/print region past the rollers 8, 9 and 10.

Figure 9:
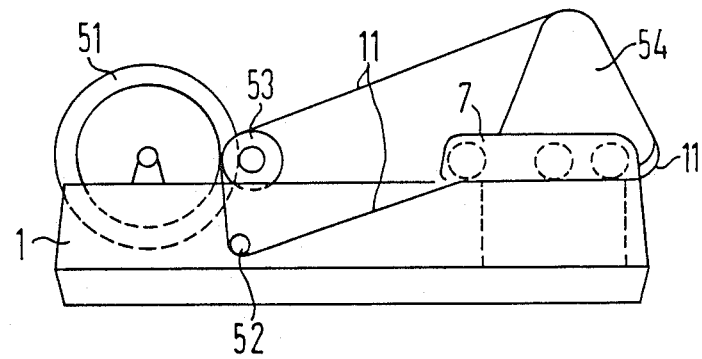

In another development of the present invention, a take up reel may be provided for accepting the recording medium after it has been scanned and printed. FIG. 9 illustrates a take-up reel 53 provided for this purpose. The roll 53 is adjacent to and in contact with the supply roll 51, and is driven thereby during the unwinding operation, by friction. The collector basket, described in connection with FIG. 3, is replaced by a paper guide 54 which guides the paper upwardly and rearwardly after it passes between the rollers 10 and 21. Since the paper is printed side up between the paper guide and the takeup rule 53, the printing applied to the paper may be inspected if desired before any part of the paper reaches the supply roll.

Figure 10:
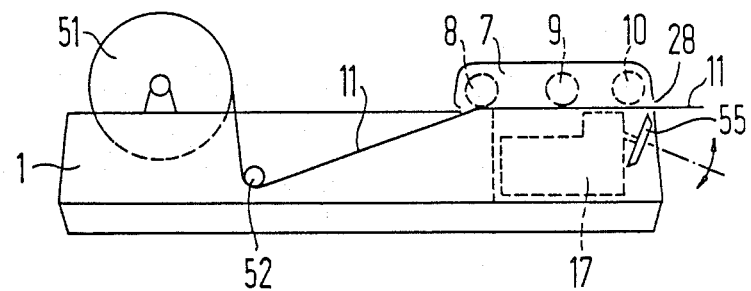

FIG. 10 illustrates a cutting mechanism which may be incorporated in the present invention. The recording medium 11 is taken from a supply roll 51, past a tension compensation roller 52, and then passes through the read/print region as described above. Cutting means comprising a cutting wheel 55 is supported on the printer carriage and is adapted to assume two switchable positions by actuating apparatus (not shown). The actuating apparatus may take the form of either a mechanical or magnetic drive, for displacing the cutter wheel upwardly so that it contacts the paper, or downwardly into its idle position as shown, out of contact with the recording medium 11.

When the cutter wheel is moved upwardly into its operating position, it engages the recording medium 11 in the region of the discharge slot 28, so that it can sever the recording medium during transverse movement of the carriage 17 relative to the recording medium 11.

As described above, the present invention advantageously combines the possibility of single or multicolor scanning of sheet-like or continuous recording media, with the possibility of single or multicolor recording, preferably using an ink jet printer. Recording media of different qualities and formats can be accommodated and the overall arrangement of the invention enables a very flat visually attractive unit to become practical, so that it may be used as a desktop device. Particularly favorable ergonomic design possibilites are thereby available. All of the display and operating elements such as lamps, keys or switches can be located on the upper part of the apparatus which facilitates accessability by an operator.

It will be apparent that the longitudinal and transverse movements of the transport mechanism and the carriage cooperate to allow line-by-line scanning and printing of the recording medium 11. This may be accomplished, for example, by the use of stepping motors for the transport mechanism so that the recording medium is advanced incrementally between scanning or printing of successive lines.

It will be apparent that other modifications and additions may be incorporated in the apparatus of the present invention without departing from the essential features of novelty thereof, which are intended to be defined and secured by the appended claims.

What is claimed is:

1. A unitary apparatus for reading or printing on a recording medium, comprising a housing containing an optical read unit, a print unit, a storage space for a quantity of recording medium, and a transport mechanism for introducing and transporting said recording medium past said read unit and said print unit to an exit slot, said housing comprising a lower housing part and an upper housing part releasable connected together, said storage space being located in said lower housing part, said transport mechanism being mounted in said upper housing part, said optical read unit and said print unit being connected together and disposed in said lower housing part beneath said transport mechanism whereby optical reading by said optical read unit and printing by said print unit takes place from below said recording medium, said transport mechanism having conveying means for conveying said recording medium from the supply chamber to the optical read unit, to the print unit, and to the exit slot along a path in a single direction, said conveying means including first drive rollers adapted to engage said recording medium from above and convey it forwardly in a feed direction, second drive rollers adapted to engage said recording medium before it is printed on or optically read, third drive rollers adapted to engage said recording medium after is has been printed, alignment levers disposed in the path of said recording medium, means for selectively rotating said first or second drive rollers in response to the recording medium striking said alignment levers, means for lowering said second and third drive rollers downwardly to engage said recording medium, said first, second and third drive rollers conveying said recording medium at a feed rate for line-by-line scanning by said optical read unit and for line-by-line printing by said print unit, and including an arc shaped basket releasably secured to the exterior of said lower housing part adjacent said exit slot for accepting said recording medium departing said exit slot and for conveying said recording medium upwardly for deposit on surface of said upper housing part.

2. Apparatus according to claim 1, including a holder for a supply roll of said recording medium mounted in said storage space, said transport mechanism adapted to pull said recording medium from said supply roll in cooperation with a tension compensation mechanism, and including a take up roll mounted in said storage space and driven by said supply roll.

* * * * *